United States Patent
Miura et al.

(10) Patent No.: US 11,574,165 B2
(45) Date of Patent: Feb. 7, 2023

(54) OPTIMIZATION SYSTEM AND OPTIMIZATION METHOD

(71) Applicant: Hitachi, Ltd., Tokyo (JP)

(72) Inventors: Seiji Miura, Tokyo (JP); Junichi Miyakoshi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 940 days.

(21) Appl. No.: 16/410,217

(22) Filed: May 13, 2019

(65) Prior Publication Data

US 2020/0065652 A1    Feb. 27, 2020

(30) Foreign Application Priority Data

Aug. 23, 2018  (JP) .............................. JP2018-156620

(51) Int. Cl.
 *G06N 3/00*     (2006.01)
 *G06F 17/00*    (2019.01)
 *G06N 3/04*     (2006.01)
 *G06F 17/11*    (2006.01)
 *G06N 3/08*     (2006.01)

(52) U.S. Cl.
 CPC ........... *G06N 3/0454* (2013.01); *G06F 17/11* (2013.01); *G06N 3/08* (2013.01)

(58) Field of Classification Search
 CPC .......... G06Q 10/00; G06Q 50/00; G06N 3/00; G06F 17/00
 See application file for complete search history.

(56) References Cited

U.S. PATENT DOCUMENTS

| | | | |
|---|---|---|---|
| 2017/0147020 A1 | 5/2017 | Turkewadikar et al. | |
| 2017/0147920 A1 | 5/2017 | Huo et al. | |
| 2017/0176994 A1* | 6/2017 | Yedidia | G06N 7/005 |
| 2018/0197017 A1* | 7/2018 | Mansour | G06V 10/7715 |
| 2019/0147013 A1* | 5/2019 | Zhuang | G06F 17/16 708/201 |
| 2019/0385043 A1* | 12/2019 | Choudhary | G06N 3/084 |

(Continued)

OTHER PUBLICATIONS

Stephen Boyd et al., "Distributed Optimization and Statistical Learning via the Alternating Direction Method of Multipliers", Foundations and Trends in Machine Learning, vol. 3, No. 1 (2010) 1-122.

*Primary Examiner* — Mustafa Iqbal
(74) *Attorney, Agent, or Firm* — Mattingly & Malur, PC

(57) ABSTRACT

An optimization system has a plurality of nodes, each including: a calculation processing unit that calculates an optimum value of a determination variable representing a parameter that controls the nodes by using the ADMM; and a function value calculation unit that receives an input of a value of the determination variable and calculates the value of the objective function based on a calculation model constructed by a learning processing. An arbitrary value of the determination variable is input to the function value calculation unit, and the calculation processing unit substitutes the value of the objective function calculated by the function value calculation unit and the arbitrary value of the determination variable into a second optimization problem by dual transformation of the first optimization problem, thereby repeatedly executing a processing of calculating a value of the dual variable until the value of the dual variable satisfies a predetermined condition.

6 Claims, 8 Drawing Sheets

(56) References Cited

U.S. PATENT DOCUMENTS

2020/0033822 A1\* 1/2020 Danielson ............ G05B 13/048
2020/0372363 A1\* 11/2020 Tang ...................... G06N 5/046
2021/0027204 A1\* 1/2021 Zhang ...................... G06F 17/14
2022/0129733 A1\* 4/2022 Yee ...................... G06K 9/6276

\* cited by examiner

| NODE ID | ADDRESS |
|---|---|
| 1 | aaa.aaa.aaa |
| 3 | bbb.bbb.bbb |

FIG. 9

| NODE ID | ADDRESS | HIERARCHY | FLAG |
|---|---|---|---|
| 1 | aaa.aaa.aaa | 1 | 1 |
| 3 | bbb.bbb.bbb | 1 | 1 |
| N | ccc.ccc.ccc | 2 | 1 |
| 4 | ddd.ddd.ddd | 2 | 0 |

OPTIMIZATION SYSTEM AND OPTIMIZATION METHOD

CLAIM OF PRIORITY

The present application claims priority from Japanese patent application JP 2018-156620 filed on Aug. 23, 2018, the content of which is hereby incorporated by reference into this application.

BACKGROUND OF THE INVENTION

1. Field of the Invention

The present invention relates to a system and a method for realizing optimization of a target system.

2. Description of the Related Art

In recent years, there is an increasing demand for efficient operation of social infrastructure and systems. Specifically, it is required to create a delivery plan and a production plan to maximize profit or effect by using congestion information, inventory information, and the like, to create an efficient distribution plan of finite social resources, to grasp a state of a complex system, and the like.

The problem as described above can be handled as an optimization problem in a system in which independent subsystems (nodes) perform control and action while affecting each other. The optimization problem refers to processing to determine a combination, an order, and a value of a control variable of the subsystems.

For example, when creating a production plan, a calculation mechanism determines a value of a control variable corresponding to a production amount and a number of shipments of a product in a factory, operation time of a manufacturing equipment and the like in an environment in which supply and demand, production efficiency and the like fluctuate, so as to satisfy constraints on a system such as electric power cost and a carbon dioxide emission amount.

As an analysis method of an optimization problem of a large-scale system, a dispersion optimization method is known. An example of the method includes an alternating direction method of multipliers (ADMM). The ADMM is known as an analysis method of an optimization problem represented by Expression (1), for example.

A subscript i represents an identification number of a subsystem, and a variable $x_i$ represents a determination variable of a subsystem. A variable z is defined by Expression (2). Further, a function $f_i$ represents an objective function in the subsystem of the subscript i, and a function g represents a constraint function. The constraint function g is given to an entire system. Note that, an optimization problem for obtaining a maximum value instead of a minimum value is represented in the same format. A specific algorithm of the ADMM is described in, for example, Stephen Boyd and 2 others, "Distributed Optimization and Statistical Learning via the Alternating Direction Method of Multipliers", Foundations and Trends in Machine Learning, Vol. 3, No. 1, pp. 1-122 (2010) (Non-Patent Literature 1).

$$\min_{\{x_i\}} \left[ \sum f_i(x_i) - g(z) \right] \quad (1)$$

$$z = \sum_{i=1}^{N} x_i \quad (2)$$

The ADMM is a calculation method for obtaining a determination variable x that minimizes or maximizes the Expression (1). The technique described in US Patent No. 2017/0147920 (Patent Literature 1) is known as a technique using the ADMM.

In Patent Literature 1, it is described that the ADMM is repeatedly executed using a plurality of work nodes, and learning of a classifier is executed until a stopping criterion is satisfied.

SUMMARY OF THE INVENTION

In order to execute calculation of the ADMM, it is necessary to define an objective function. In order to define the objective function, it is necessary to grasp in advance a behavior of a subsystem and an interaction among subsystems.

However, the objective function may not be defined when a behavior of a complex system or subsystem is unknown. Further, the objective function needs to be defined again when addition and deletion of a subsystem is performed dynamically and the interaction among subsystems dynamically changes.

Therefore, in the related art, it is difficult to apply the ADMM to a system in which an objective function is difficult to define and a system in which an objective function dynamically changes.

The invention provides a calculation method of an optimization problem that can be applied to a system in which an objective function is difficult to define and a system in which an objective function dynamically changes, and a system for realizing the calculation method.

A representative example of the invention disclosed in the present application is as follows. That is, the example provides an optimization system that optimizes a target system configured by a plurality of nodes each including a processor, a memory connected to the processor, and a network interface connected to the processor. Each of the plurality of nodes includes: a calculation processing unit that calculates an optimum value of a determination variable as a solution of a first optimization problem by using an alternating direction method of multipliers, the first optimization problem being given by an objective function and a constraint function in which the determination variable, which represents a parameter that controls each of the plurality of nodes, serves as a variable; a function value calculation unit that receives an input of a value of the determination variable and calculates the value of the objective function based on a calculation model constructed by a learning processing using learning data configured by the value of the determination variable and the value of the objective function; and a control unit that controls the nodes based on the optimum value of the determination variable calculated by the calculation processing unit. The calculation processing unit inputs an arbitrary value of the determination variable to the function value calculation unit, and substitutes the value of the objective function and the arbitrary value of the determination variable into a second optimization problem given by the objective function and a function in which the dual variable serves as a variable by dual transformation of the first optimization problem, thereby repeatedly executing a processing of calculating a value of a dual variable until the value of the dual variable satisfies a predetermined condition. The calculation processing unit acquires the value of the dual variable calculated by another node via the network interface and stores the value in the memory, and calculates the optimum value of the determination variable of a self-node based on the value of the dual variable calculated by the self-node and the other node and stores the optimum value in the memory.

According to the invention, it is possible to realize a calculation method of an optimization problem that can be applied to a system in which an objective function is difficult to define and a system in which an objective function dynamically changes. Problems, configurations, and effects other than those described above will become apparent from following descriptions of embodiments.

BRIEF DESCRIPTION OF THE DRAWINGS

FIG. 9 shows an example of a data structure of a candidate node list generated by a node according to the fourth embodiment;

DESCRIPTION OF THE PREFERRED EMBODIMENTS

Figure 1:
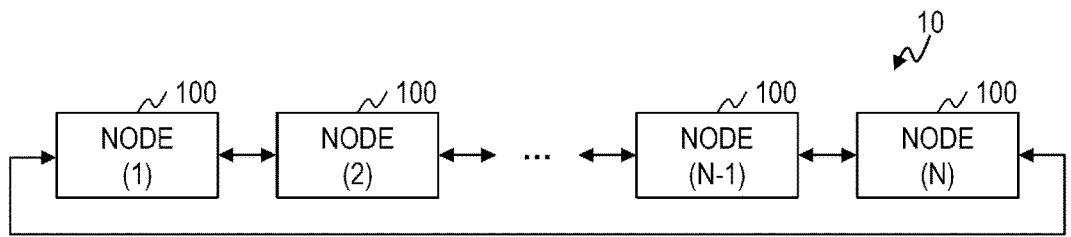
FIG. 1 shows a configuration example of an optimization target system according to a first embodiment.

Embodiments of the invention will be described below with reference to the drawings. However, the invention should not be construed as being limited to descriptions of the embodiments described below. It will be readily understood by those skilled in the art that a specific configuration may be modified without departing from the spirit or scope of the invention.

In the configuration of the invention described below, the same or similar components or functions are denoted by the same reference numerals, and repetitive descriptions thereof will be omitted.

Terms "first", "second", "third," and the like in the present specification are used to identify constituent elements, and do not necessarily limit the number or order.

Positions, sizes, shapes, ranges, and the like of respective components shown in the drawings may not represent actual positions, sizes, shapes, ranges, and the like in order to facilitate understanding of the invention. Therefore, the invention is not limited to the positions, sizes, shapes, and ranges disclosed in the drawings.

First Embodiment

FIG. 1 shows a configuration example of an optimization target system according to the first embodiment.

A system 10 is formed by a plurality of nodes 100. The number of the nodes 100 in FIG. 1 represents identification information (identification number) of the nodes 100. The plurality of nodes 100 form a system (target system) to be optimized. In addition, in the target system, connections between interacting nodes 100 form a node network.

The interacting nodes 100 represent nodes 100 that acquire a value of a dual variable y described below. The node network is different from a physical communication network such as a Local Area Network (LAN) and a Wide Area Network (WAN). In the following description, connections between the interacting nodes 100 are described as a logical connection. Also, a node 100 connected to an arbitrary node 100 via the logical connection will be described as a connection node 100.

The nodes 100 calculate a value of a determination variable which is a parameter for controlling action and processing of the nodes 100 by calculating the optimization problem. The nodes 100 perform control based on the value of the determination variable. Specifically, the nodes 100 perform control based on a value of the determination variable $x_i$ calculated from the Expression (1). Note that, the invention is not limited to contents of the control performed by the nodes 100.

In the first embodiment, the ADMM is used as an analysis method of the optimization problem. In the ADMM according to the first embodiment, a main problem shown in Expression (1) is transformed into a dual problem shown in Expression (3), and the value of the determination variable $x_i$ is calculated from the dual problem.

$$\min_{y}\left[\sup_{x_i}[-x_iy - f_i(x_i)] + g*(y)\right] \quad (3)$$

More specifically, the nodes 100 alternately update the determination variable $x_i$ and the dual variable y until an end condition is satisfied, thereby calculating the determination variable $x_i$ to be an optimum solution. Processing for realizing the algorithm will be described with reference to FIG. 4.

Conventionally, it is necessary to give the objective function $f_i(x_i)$ in advance. In the first embodiment, a value of the objective function $f_i(x_i)$ (objective function value) is calculated by replacing the objective function $f_i(x_i)$ with a neural network.

Figure 2:
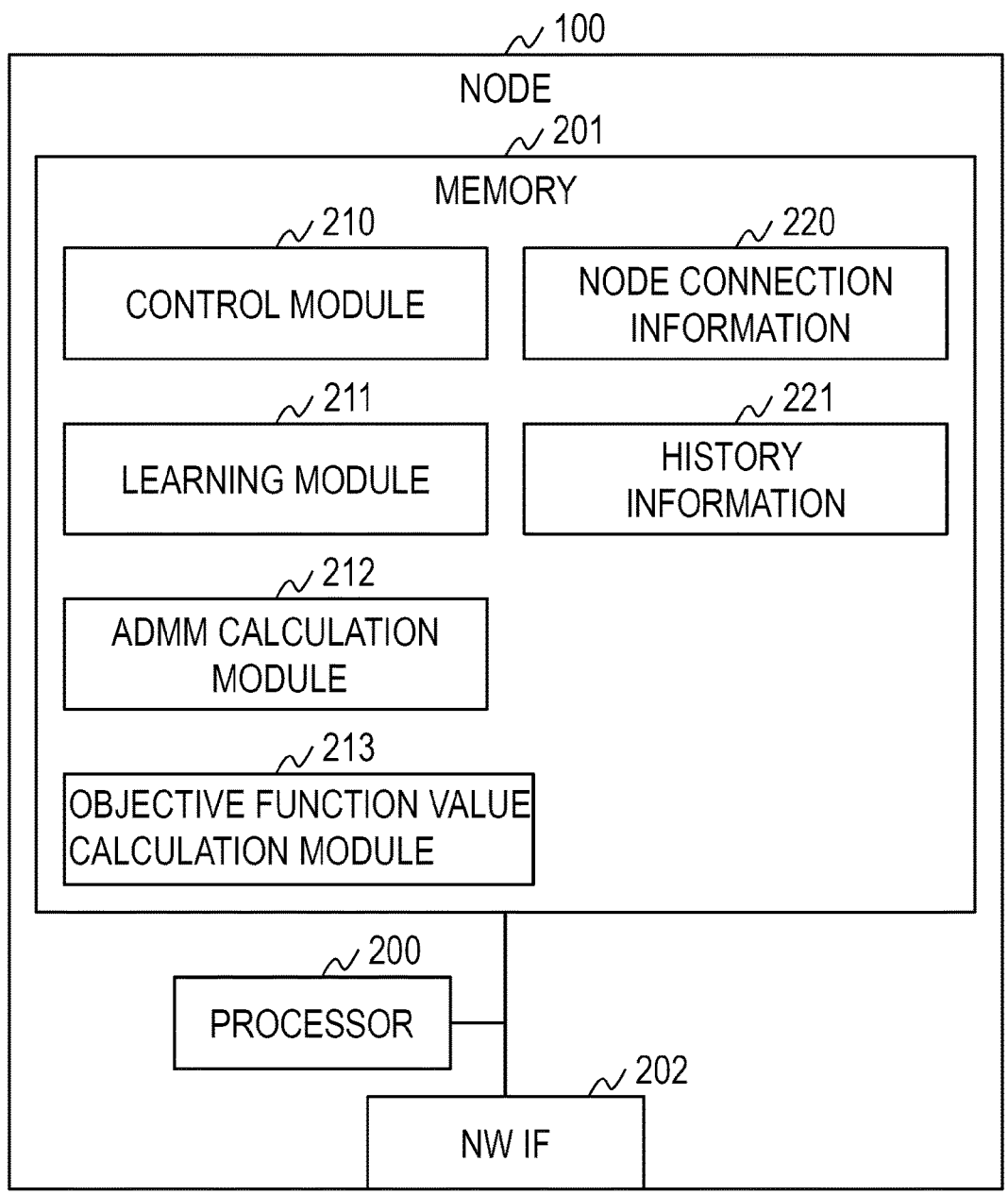
FIG. 2 shows an example of a configuration of a node according to the first embodiment.

FIG. 2 shows an example of a configuration of a node 100 according to the first embodiment.

The node 100 includes a processor 200, a memory 201, and a network interface 202 as hardware. The hardware is connected to each other via an internal bus.

The processor 200 executes a program stored in the memory 201. The processor 200 operates as a module that realizes a specific function by executing processing in accordance with a program. In the following description, when processing is described with a module as a subject, it shows that the processor 200 executes a program that realizes the module.

The memory 201 stores a program to be executed by the processor 200 and information used by a program. Further, the memory 201 includes a work collar temporarily used by a program. The program and information stored in the memory 201 will be described below.

The network interface 202 is an interface for communication with an external apparatus via a communication network.

Here, the program and information stored in the memory 201 will be described. The memory 201 stores a program that realizes a control module 210, a learning module 211, an ADMM calculation module 212, and an objective function value calculation module 213. Further, the memory 201 stores node connection information 220 and history information 221.

The control module 210 manages all the nodes 100. The learning module 211 executes a learning processing for constructing a neural network used by the objective function value calculation module 213. The ADMM calculation module 212 calculates the determination variable $x_i$ based on the ADMM. The objective function value calculation module 213 calculates an objective function value using the neural network which is a calculation model constructed by the learning processing. Note that, an initial neural network is set in each of the nodes 100. However, the neural network is updated by the learning module 211.

The node connection information 220 is information for management of a node network. Details of the node connection information 220 will be described below with reference to FIG. 3. The history information 221 is information for management of the value of the determination variable $x_i$ and the objective function value calculated in the past. For example, the history information 221 includes history data configured by a time stamp, the value of the determination variable $x_i$ and the objective function value.

A plurality of modules provided in the node 100 may be integrated into one single module, or one module may be divided into a plurality of modules for each function. For example, the control module 210 and the ADMM calculation module 212 may be one module, or the ADMM calculation module 212 and the objective function value calculation module 213 may be one module.

Figures 3, 4:
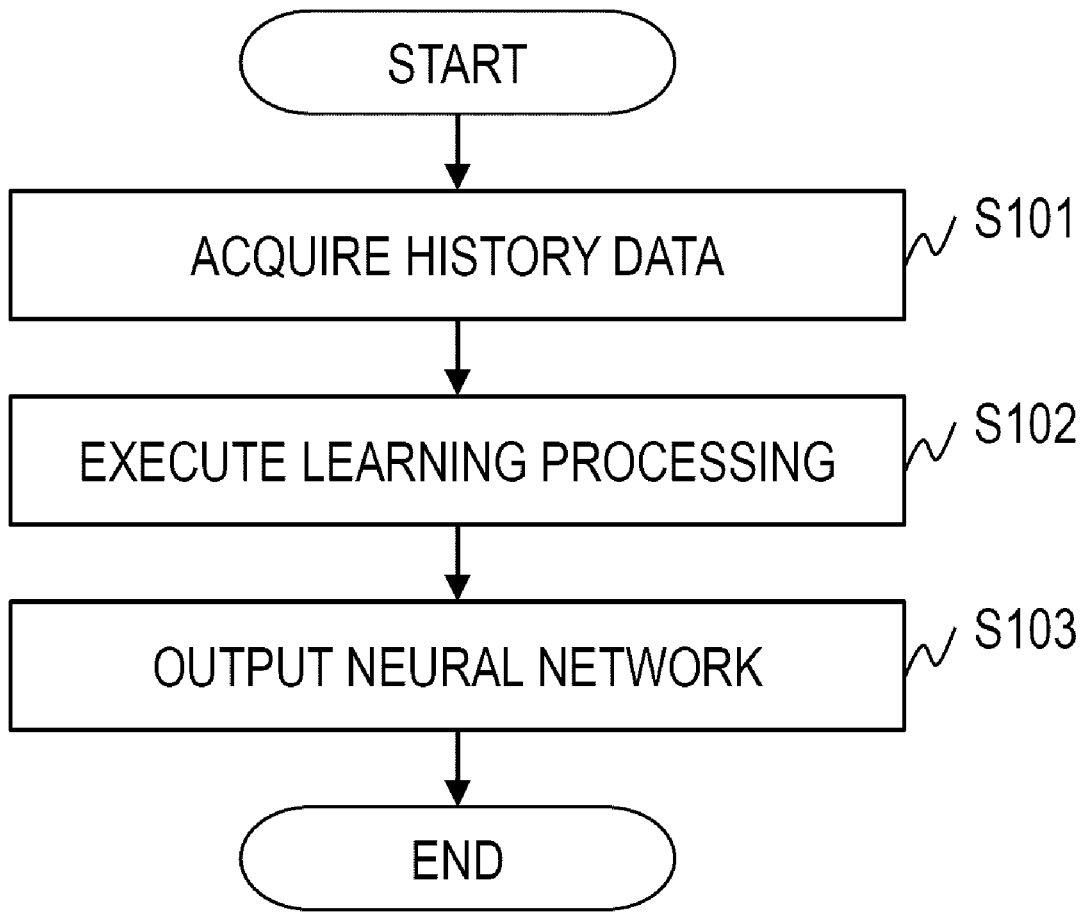
FIG. 3 shows an example of a data structure of node connection information according to the first embodiment.
FIG. 4 is a flowchart showing an example of a construction processing of a neural network executed by a node according to the first embodiment.

FIG. 3 shows an example of a data structure of the node connection information 220 according to the first embodiment.

The node connection information 220 stores an entry corresponding to a node 100 that interacts with the self-node 100 that includes the above-described node connection information 220, that is, a node 100 that forms a logical connection with the self-node 100. The entry is configured by a node ID 301 and an address 302. Note that, the configuration of the entry is an example, and the invention is not limited thereto. For example, the entry may include a field that stores strength of interaction (strength of the logical connection) and a distance between the interacting nodes 100.

The node ID 301 is a field where identification information of the node 100 that interacts with the self-node 100 is stored. The address 302 is a field where an address for communication with the node 100 corresponding to the node ID 301 is stored.

FIG. 4 is a flowchart showing an example of a construction processing of a neural network executed by the node 100 according to the first embodiment.

The control module 210 of the node 100 instructs the learning module 211 to execute a learning processing when detecting an execution trigger. For example, the control module 210 detects a progress of an execution period or reception of an execution request from the outside as the execution trigger.

The learning module 211 acquires history data from the history information 221 (step S101).

The learning module 211 may acquire all history data stored in the history information 221, or may acquire a predetermined number piece of history data in a new order from a time stamp. Further, the learning module 211 may acquire history data in which the time stamp is included in an arbitrary time range.

Note that, the acquired history data is determined in accordance with processing capability of the node 100, time required for a start of control of the node 100, and the like.

Next, the learning module 211 executes a learning processing for constructing a neural network using the history data (step S102). In the first embodiment, the learning processing using the history data as learning data is executed. The learning module 211 constructs the neural network that outputs an objective function value for input of the value of the determination variable $x_i$. A detailed description of the learning processing will be omitted since it is known.

Next, the learning module 211 outputs the constructed neural network to the objective function value calculation module 213 (step S103), and ends the processing.

At this time, the objective function value calculation module 213 updates the current neural network to a new neural network. The objective function value calculation module 213 sets the input neural network when the neural network is not held.

Figure 5:
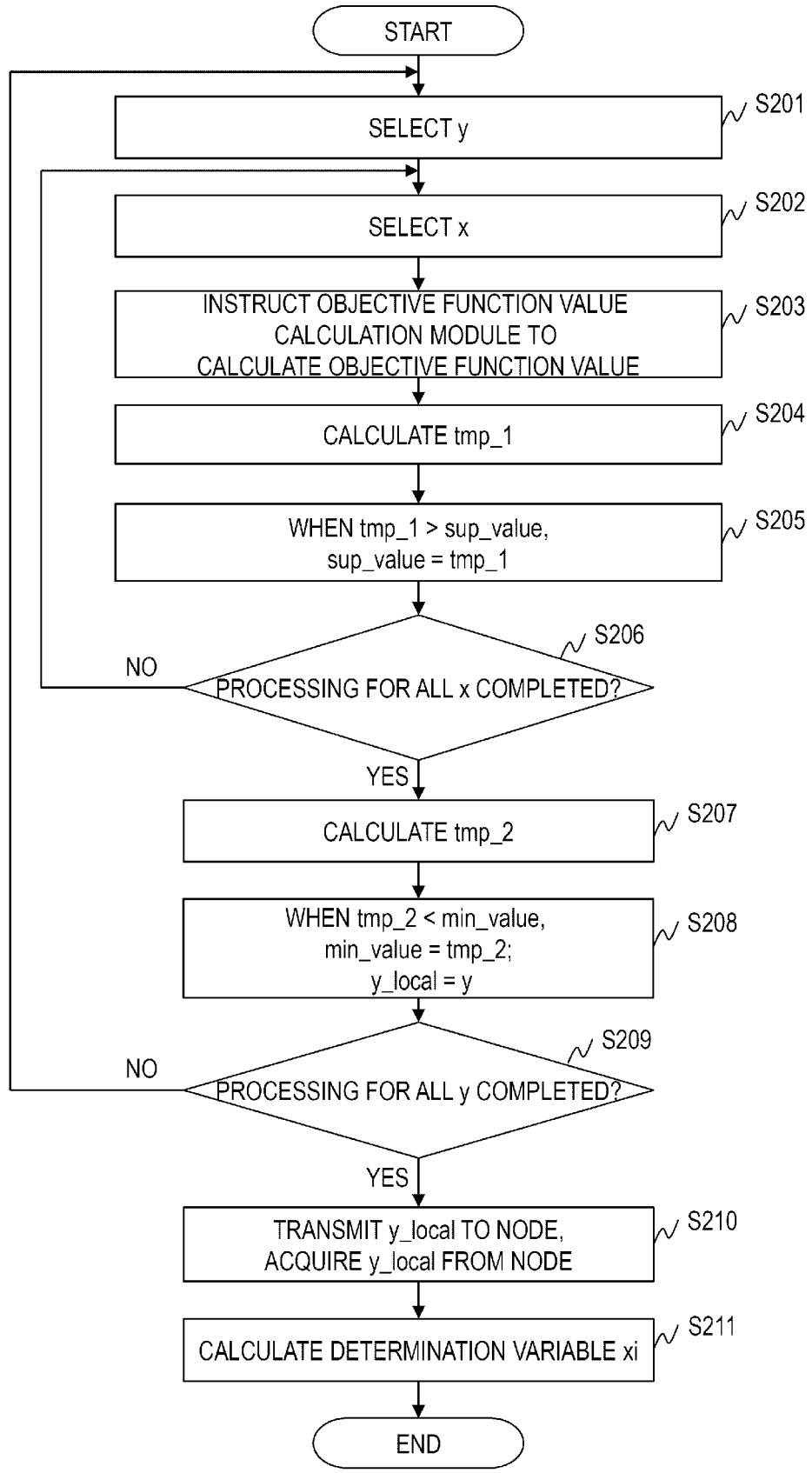
FIG. 5 is a flowchart showing an example of a determination variable calculation processing executed by a node of the first embodiment.

FIG. 5 is a flowchart showing an example of a determination variable calculation processing executed by the node 100 according to the first embodiment.

The control module 210 of the node 100 instructs the ADMM calculation module 212 to execute processing periodically or when receiving an instruction from the outside. The ADMM calculation module 212 initializes variables of sup_value, min_value, tmp_1, tmp_2, and y_local, and then starts the following processing.

The ADMM calculation module 212 refers to the history information 221 and selects a value of the dual variable y (step S201). Further, the ADMM calculation module 212 selects a value of the determination variable $x_i$ (step S202).

Note that, it is assumed that a range of possible values of the dual variable y and the determination variable $x_i$ is set in advance.

Next, the ADMM calculation module 212 outputs a calculation instruction of the objective function value to the objective function value calculation module 213 (step S203). At this time, the objective function value calculation module 213 calculates the objective function value by inputting the value of the determination variable $x_i$ to the neural network.

Next, the ADMM calculation module 212 substitutes the objective function value, the value of the determination variable $x_i$, and the value of the dual variable y into Formula (4) to calculate tmp_1 (step S204).

$$tmp\_1 = -x_i y - f_i(x_i) \quad (4)$$

Next, the ADMM calculation module 212 updates sup_value to tmp_1 when tmp_1 is larger than sup_value (step S205). Note that, the ADMM calculation module 212 sets tmp_1 to sup_value when no value is set in sup_value.

Next, the ADMM calculation module 212 determines whether or not the processing for values of all determination variables $x_i$ is completed (step S206).

The ADMM calculation module 212 returns to step S202 and executes the same processing when it is determined that the processing for the values of all determination variables $x_i$ is not completed.

The ADMM calculation module 212 substitutes sup_value into Formula (5) to calculate tmp_2 when it is determined that the processing for the values of all determination variables $x_i$ is completed (step S207).

$$tmp\_2 = sup\_value + y^*(y) \qquad (5)$$

Next, the ADMM calculation module 212 updates min_value to tmp_2 and updates y_local to the value of the dual variable y selected in step S201 when tmp_2 is smaller than min_value (step S208). Note that, when no value is set in min_value, the ADMM calculation module 212 sets tmp_2 to min_value and sets the value of the dual variable y selected in step S201 to y_local.

Next, the ADMM calculation module 212 determines whether or not the processing for all dual variables y is completed (step S209).

The ADMM calculation module 212 returns to step S201 and executes the same processing when it is determined that the processing for all dual variables y is not completed.

When it is determined that the processing for all dual variables y is completed, the ADMM calculation module 212 transmits y_local to the connection node 100 based on the node connection information 220, and acquires the y_local calculated from the connection node 100 (step S210).

Specifically, the ADMM calculation module 212 transmits y_local to the connection node 100, and then shifts to a wait state. The ADMM calculation module 212 moves to the next step when y_local is acquired from all connection nodes 100.

Note that, when y_local is received from another node 100, the connection node 100 may acquire y_local stored in a newest history data from the history information 221 and transmit the y_local to another node 100, or start a determination variable calculation processing.

Next, the ADMM calculation module 212 calculates a value of the determination variable $x_i$ based on y_local calculated by the self-node 100 and the connection node 100 (step S211).

At this time, the ADMM calculation module 212 stores history data associating the value of the determination variable $x_i$ and the objective function value in the history information 221.

In this manner, the ADMM calculation module 212 repeatedly executes the processing of calculating y_local until an optimal solution of the dual problem is obtained, and calculates an optimum value of the determination variable $x_i$ using y_local calculated by the self-node 100 and the connection node 100.

The control module 210 controls the node 100 based on the value of the calculated determination variable $x_i$. For example, when the system 10 is a traffic management system, a passenger car corresponds to the node 100, and a movement route corresponds to the determination variable $x_i$. In this case, the node 100 avoids congestion and calculates a movement route toward a destination in a shortest time, and navigates the movement to the movement route.

According to the first embodiment, a neural network is constructed by a learning processing and the optimization problem can be solved by using the neural network even when the objective function $f_i(x_i)$ cannot be defined. That is, optimization of control of each node 100 can be realized.

Second Embodiment

The second embodiment describes a processing executed when a node 100 is added to the system 10. In the following description, the node 100 newly added to the system 10 is described as a new node 100.

The configuration of the system 10 according to the second embodiment is the same as that in the first embodiment. The hardware configuration of the node 100 according to the second embodiment is the same as that in the first embodiment. The software configuration of the node 100 in the system 10 is the same as that in the first embodiment.

The software configuration of the node 100 added to the system 10 is partially different from that in the first embodiment. Specifically, the node 100 added to the system 10 does not hold the node connection information 220 and the history information 221.

Figure 6:
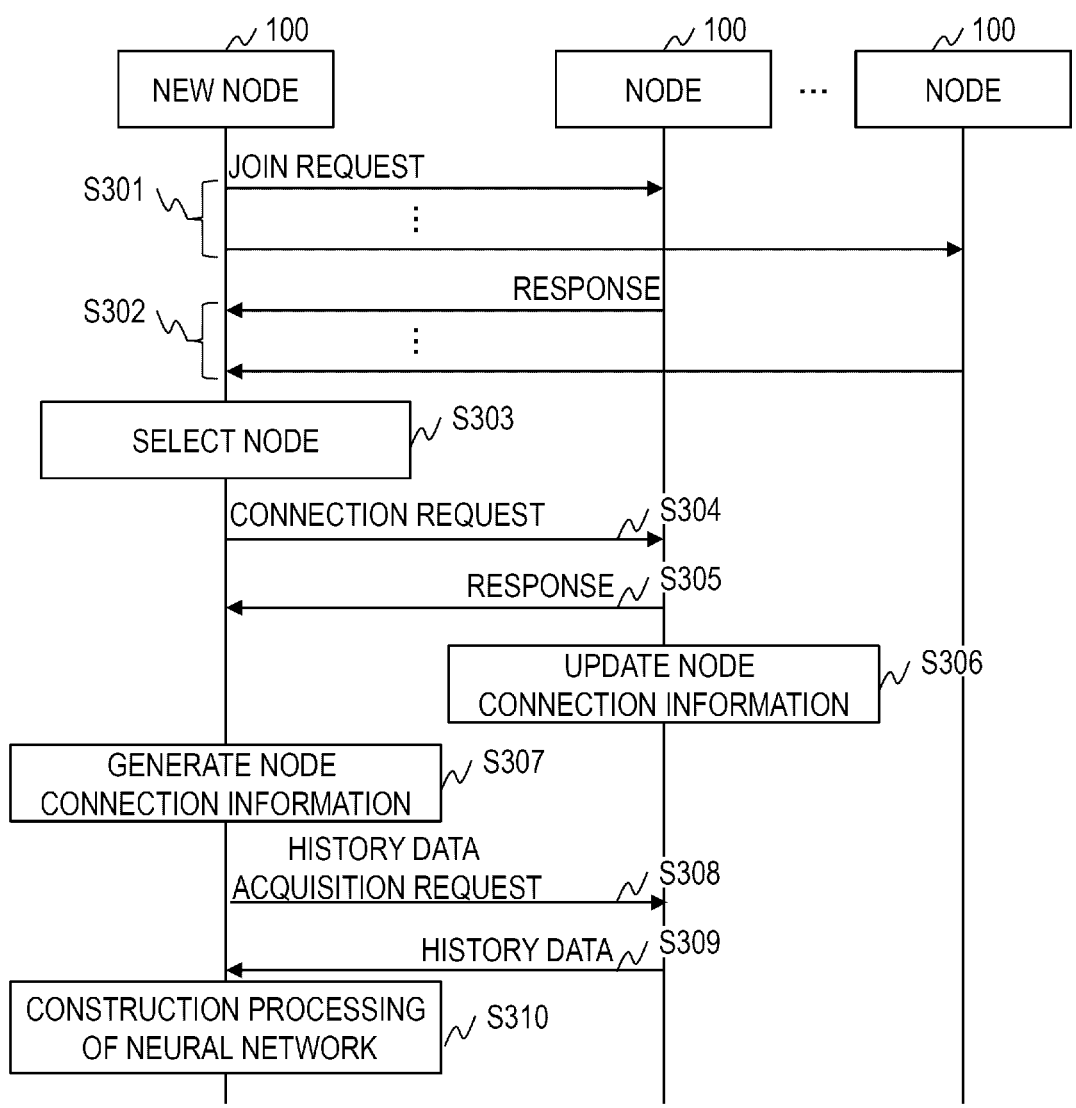
FIG. 6 is a sequence diagram showing a processing flow executed when a new node is added to a system according to a second embodiment.

FIG. 6 is a sequence diagram showing a processing flow executed when the new node 100 is added to the system 10 according to the second embodiment.

The control module 210 of the new node 100 transmits a join request to all nodes 100 in the system 10 (step S301).

Upon receiving the join request, the control module 210 of the node 100 in the system 10 transmits a response including identification information and an address of the self-node 100 to the new node 100 (step S302).

The control module 210 of the new node 100 selects a connection destination node 100 based on the response from the node 100 in the system 10 (step S303).

Specifically, the control module 210 selects a predetermined number of nodes 100 in descending order of communication time or a physical distance between the new node 100 and another node 100. Note that, the control module 210 may select one or more nodes 100 from the nodes 100 other than adjacent nodes 100 in order to take in influence from nodes 100 that are not adjacent to each other.

The control module 210 of the new node 100 transmits a connection request to the selected node 100 (step S304). The connection request includes identification information and an address of the new node 100.

Upon receiving the connection request, the control module 210 of the node 100 in the system 10 transmits a response to the new node 100 (step S305) and updates the node connection information 220 based on the information included in the connection request (step S306).

Specifically, the control module 210 adds an entry to the node connection information 220, and sets the identification information and the address of the new node 100 to the node ID 301 and the address 302 of the added entry.

The control module 210 of the new node 100 generates the node connection information 220 after receiving the response from the selected node 100 (step S307).

Specifically, the control module 210 adds an entry to the node connection information 220, and sets identification information and an address of the node 100 that transmits the response to the node ID 301 and the address 302 of the added entry. Note that, when there is a plurality of selected nodes 100, the control module 210 executes the same processing when the response is received from each node 100.

Through the above processing, the new node 100 forms a logical connection with the selected node 100. That is, the configuration of a node network is changed.

The control module 210 of the new node 100 transmits a history data acquisition request to the selected node 100 (step S308).

When there is a plurality of selected nodes 100, the control module 210 determines a data amount of history data acquired from each node 100 based on characteristics of a logical connection, that is, strength of interaction. The control module 210 transmits the history data acquisition request including the data amount to each node 100.

For example, in the second embodiment, a ratio is used as a value representing the data amount of the history data. The control module 210 determines the ratio such that the data amount of the history data acquired from each node 100 is the same. Further, the control module 210 also determines the ratio based on a numerical value representing the strength of the connection. Note that, the ratio is determined such that a total value of the ratio of each node 100 is 100.

It is considered that the new node 100 behaves similarly to the connection node 100. Therefore, it is estimated that an objective function is also similar. Therefore, the new node 100 constructs a neural network by executing a learning processing using the history data of the connection node 100.

Upon receiving the history data acquisition request, the node 100 reads out the history data from the history information 221 and transmits the history data to the new node 100 (step S309).

The control module 210 reads out a predetermined number piece of history data from the history information 221 based on a ratio when the ratio is included in the history data acquisition request. For example, the control module 210 reads out the history data of 50 percent of the total data amount (number of entries) of the history information 221 when the ratio is 50.

The new node 100 executes the construction processing of the neural network using the received history data when acquiring the history data from all selected nodes 100 (step S310). The construction processing of the neural network according to the second embodiment is the same as that in the first embodiment. Therefore, a description thereof will be omitted.

Note that, the selected node 100 may execute the determination variable calculation processing after the processing of step S309. The new node 100 may also execute the determination variable calculation processing after the processing of step S310.

According to the second embodiment, it is possible to execute the ADMM calculation without setting the objective function in advance when adding the new node 100 to the system 10. In addition, the node 100 in the system 10 can update the neural network in accordance with a change in the configuration of the node network accompanying the addition of the new node 100, and optimize the control following the change.

Third Embodiment

The third embodiment describes processing executed when a node 100 is deleted from the system 10. In the following description, the node 100 deleted from the system 10 will be described as a deletion node 100.

The configuration of the system 10 according to the third embodiment is the same as that in the first embodiment. The hardware configuration and hardware of the node 100 according to the third embodiment are the same as those in the first embodiment.

Figure 7:
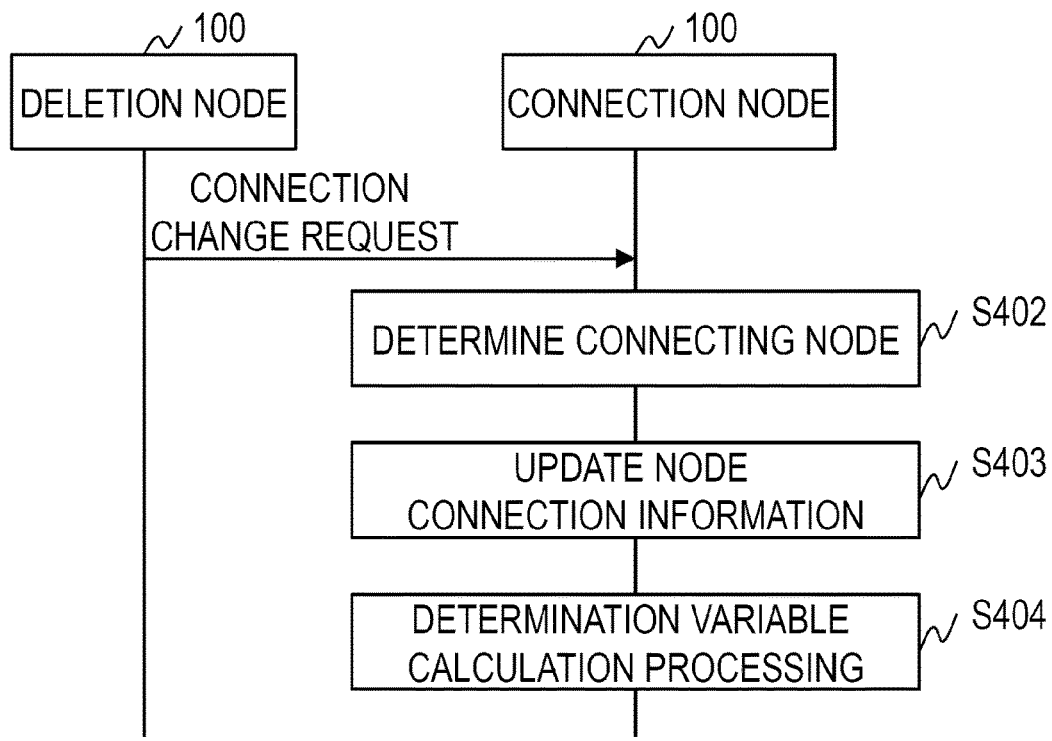
FIG. 7 is a sequence diagram showing a processing flow executed when a deletion node is deleted from a system according to a third embodiment.

FIG. 7 is a sequence diagram showing a processing flow executed when the deletion node 100 is deleted from the system 10 according to the third embodiment.

The deletion node 100 refers to the node connection information 220 and transmits a connection change request to the connection node 100 (step S401). The connection change request includes identification information of the deletion node 100 and the node connection information 220 held by the deletion node 100.

The connection node 100 determines a newly connected node 100 when receiving the connection change request (step S402).

Specifically, the control module 210 refers to the node connection information 220 included in the connection change request, and acquires identification information of the node 100 from the node ID 301 of each entry. The control module 210 compares the node ID 301 of the node connection information 220 held by the self-node 100 with the acquired identification information of the node 100, and specifies the node 100 that is not registered. The control module 210 determines the node 100 to which the specified node 100 is connected.

The connection node 100 updates the node connection information 220 (step S403).

Specifically, the control module 210 searches for and deletes an entry in which the identification information of the deletion node 100 is set in the node ID 301. The control module 210 refers to the node connection information 220 received from the deletion node 100, and acquires an entry in which the identification information of the determined node 100 is set in the node ID 301. The control module 210 adds the acquired entry to the node connection information 220.

A logical connection between the connection node 100 and the deletion node 100 is deleted by the processing. That is, the deletion node 100 is deleted from the node network. Further, the connection node 100 forms a logical connection with another node 100 to which the deletion node 100 is connected.

The connection node 100 executes a determination variable calculation processing (step S404). The determination variable calculation processing is the same as that in the first embodiment. Therefore, a description thereof will be omitted.

According to the third embodiment, the connection node 100 changes the configuration of the node network with the deletion of the node 100 from the system 10. Further, the connection node 100 calculates a value of the determination variable $x_i$ as the configuration of the node network is changed. Therefore, the node 100 in the system 10 can update the neural network in accordance with the change in the configuration of the node network accompanying the deletion of the deletion node 100, and optimize the control following the change.

Fourth Embodiment

The fourth embodiment describes processing executed when the node 100 dynamically changes the connection node 100.

The configuration of the system 10 according to the fourth embodiment is the same as that in the first embodiment. The hardware configuration and hardware of the node 100 according to the fourth embodiment are the same as those in the first embodiment.

Figure 8:
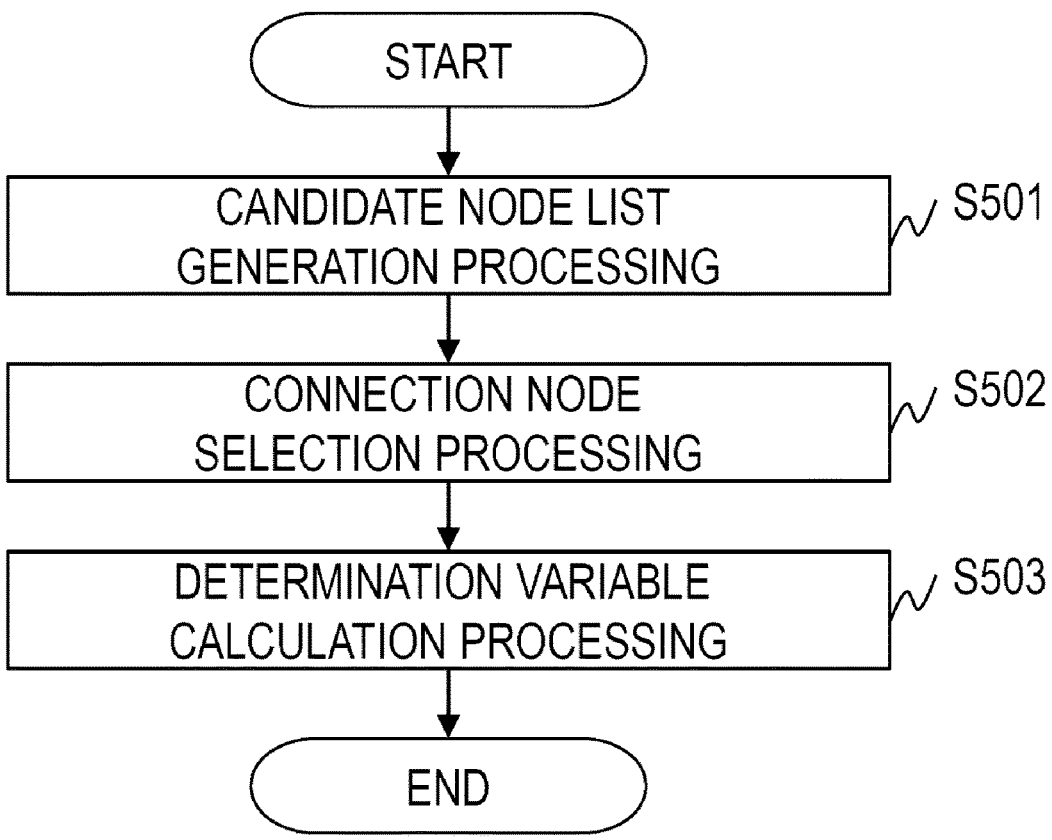
FIG. 8 is a flowchart showing an outline of a logical connection change processing executed by a node according to a fourth embodiment.

FIG. 8 is a flowchart showing an outline of a logical connection change processing executed by the node 100 according to the fourth embodiment.

The control module 210 executes a candidate node list generation processing (step S501). A candidate node list 900 is generated by the processing. A data structure of the candidate node list 900 will be described in detail with reference to FIG. 9. Details of the candidate node list generation processing will be described with reference to FIG. 10.

Next, the control module 210 executes a connection node selection processing (step S502). The connection node selection processing will be described in detail with reference to FIG. 11.

Next, the control module 210 executes a determination variable calculation processing (step S503). The determination variable calculation processing according to the fourth embodiment is the same as that in the first embodiment.

FIG. 9 shows an example of the data structure of the candidate node list 900 generated by the node 100 according to the fourth embodiment.

The candidate node list 900 is information generated in the logical connection change processing. The candidate node list 900 is deleted after the logical connection changing processing is ended.

The candidate node list 900 stores an entry configured by a node ID 901, an address 902, a hierarchy 903, and a flag 904. One entry exists for the node 100 that is a candidate of the connection node 100.

The node ID 901 is a field where identification information of the node 100 selected as the candidate node 100 is stored.

The address 902 is a field where an address for communication with the node 100 corresponding to the node ID 901 is stored.

The hierarchy 903 is a field where a number of nodes 100 that are passed before reaching the node 100 corresponding to the node ID 901 in the node network is stored.

The flag 904 is a field where a flag showing whether or not the entry is a processed entry in the candidate node list generation processing is stored. In the flag 904, one of "1" showing processed and "0" showing unprocessed is stored.

Figure 10:
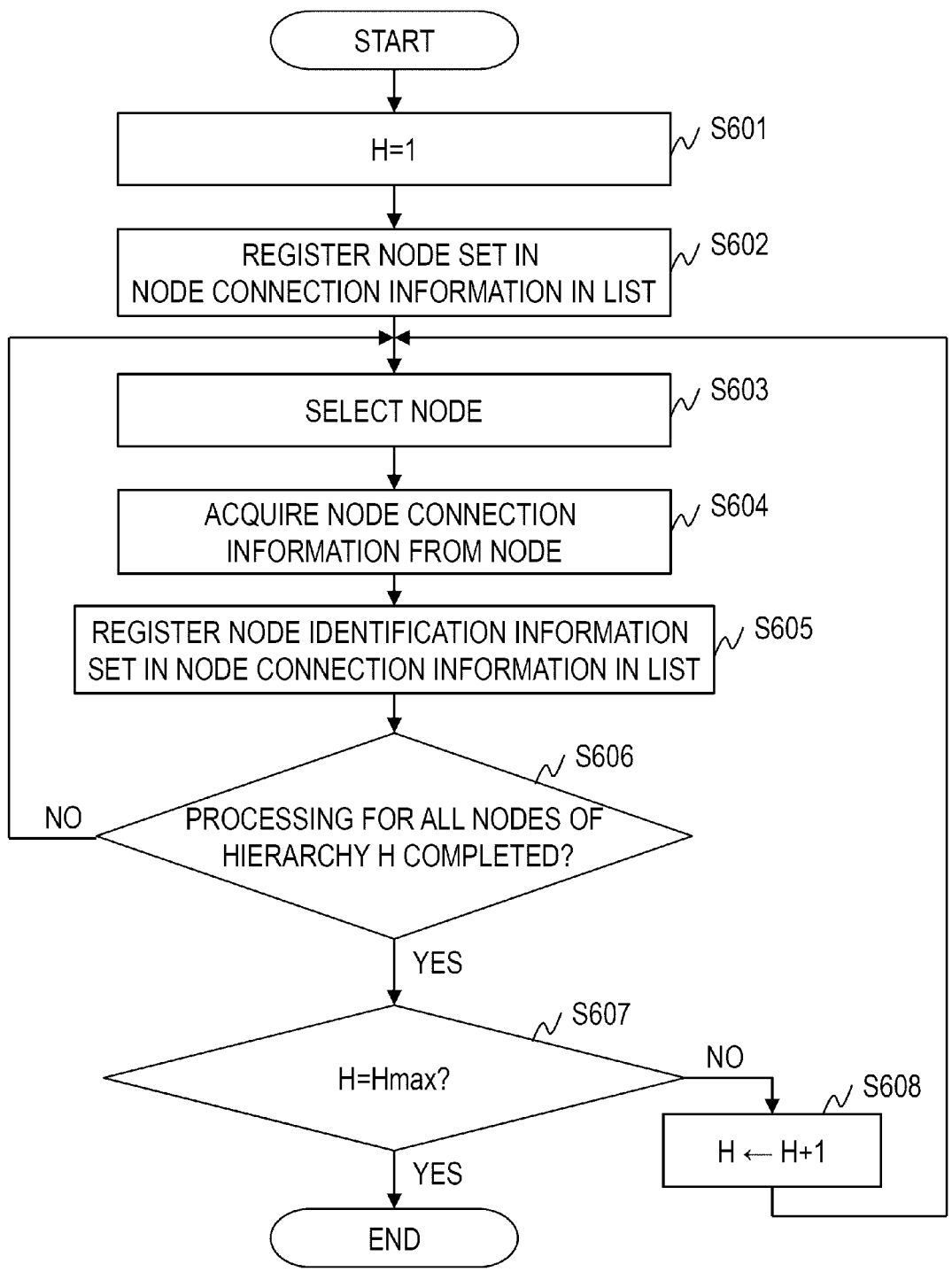
FIG. 10 is a flowchart showing an example of a candidate node list generation processing executed by a node according to the fourth embodiment.

FIG. 10 is a flowchart showing an example of the candidate node list generation processing executed by the node 100 according to the fourth embodiment. It is assumed that Hmax is set as a maximum value of a hierarchical variable H showing a search range in the node network.

The control module 210 sets "1" as an initial value to the hierarchical variable H (step S601).

Next, the control module 210 registers the node 100 set in the node connection information 220 held by the self-node 100 in the candidate node list 900 (step S602). Specifically, the following processing is executed.

The control module 210 adds an entry to the candidate node list 900 by the number of entries stored in the node connection information 220. The control module 210 sets values of the node ID 301 and the address 902 of each entry of the node connection information 220 in the node ID 901 and the address 902 of each added entry.

Further, the control module 210 sets a value of the hierarchical variable H to the hierarchy 903 of each added entry, and sets "0" to the flag 904. The above is the description of the processing in step S602.

Next, the control module 210 refers to the candidate node list 900, and selects a target entry (target node 100) from the entries in which a value of the hierarchy 903 matches a value of the hierarchical variable H and the flag 904 is "0" (step S603).

Next, the control module 210 acquires the node connection information 220 from the target node 100 (step S604).

Specifically, the control module 210 acquires the node connection information 220 by accessing the target node 100 based on the address 902 of the target entry.

Next, the control module 210 registers the node 100 set in the node connection information 220 acquired from the target node 100 in the candidate node list 900 (step S605). Specifically, the following processing is executed.

The control module 210 adds an entry to the candidate node list 900 by the number of entries stored in the acquired node connection information 220. The control module 210 sets values of the node ID 301 and the address 902 of each entry of the acquired node connection information 220 in the node ID 901 and the address 902 of each added entry.

The control module 210 sets a value of the hierarchical variable H to the hierarchy 903 of each added entry.

The control module 210 sets "1" to the flag 904 when the value of the hierarchical variable H is Hmax. The control module 210 sets "0" to the flag 904 when the value of the hierarchical variable H is not Hmax. The above is the description of the processing in step S605.

Next, the control module 210 determines whether or not the processing for all entries in which the value of the hierarchy 903 matches the value of the hierarchical variable H is completed (step S606).

Specifically, the control module 210 determines whether or not the flag 904 of all entries in which the value of the hierarchy 903 matches the value of the hierarchical variable H is "1". The control module 210 determines that the processing for all entries in which the value of the hierarchy 903 matches the value of the hierarchical variable H is completed when the above condition is satisfied.

The control module 210 returns to step S603 and executes the same processing when it is determined that the processing for all entries in which the value of the hierarchy 903 matches the value of the hierarchical variable H is not completed.

The control module 210 determines whether or not the value of the hierarchical variable H is Hmax when it is determined that the processing for all entries in which the value of the hierarchy 903 matches the value of the hierarchical variable H is completed (step S607).

The control module 210 sets a value obtained by adding 1 to a value of a current hierarchical variable H to the hierarchical variable H when it is determined that the value of the hierarchical variable H is not Hmax (step S608). Thereafter, the control module 210 returns to step S603 and executes the same processing.

The control module 210 ends the processing when it is determined that the value of the hierarchical variable H is Hmax.

Figure 11:
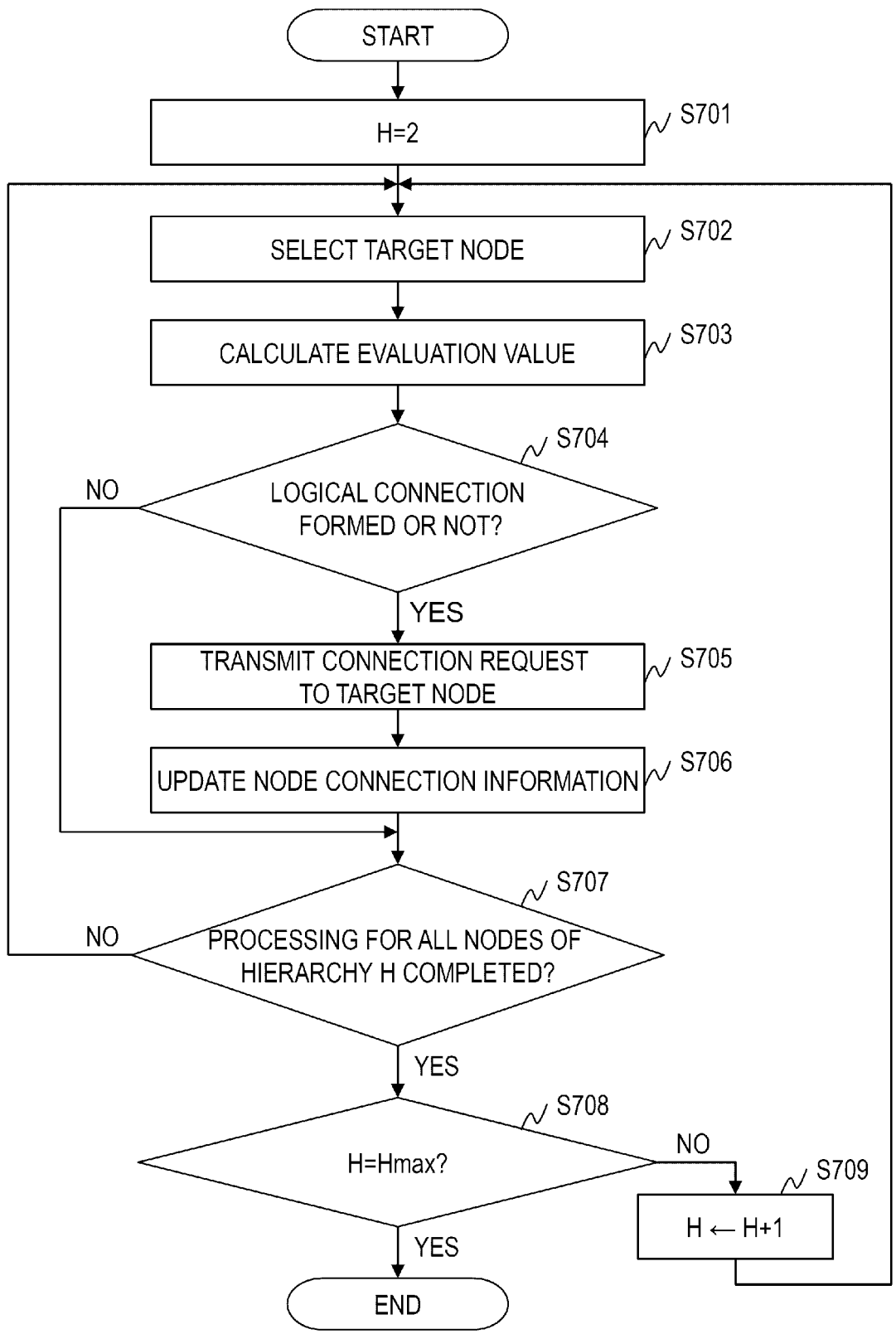
FIG. 11 is a flowchart showing an example of a connection node selection processing executed by a node according to the fourth embodiment.

FIG. 11 is a flowchart showing an example of the connection node selection processing executed by the node 100 according to the fourth embodiment.

The control module 210 sets "2" as an initial value to the hierarchical variable H (step S701). At this time, the control module 210 sets "0" to the flag 904 of the entry in which the value of the hierarchy 903 is two or more.

Next, the control module 210 refers to the candidate node list 900, and selects a target entry (target node 100) from the entries in which a value of the hierarchy 903 matches a value of the hierarchical variable H and the flag 904 is "0" (step S702).

Next, the control module 210 calculates an evaluation value when a logical connection is formed between target nodes 100 (step S703). For example, the control module 210 calculates a value of a function g(z) as the evaluation value. Note that, the invention is not limited to the types of the evaluation values.

Next, the control module 210 determines that whether or not the logical connection is formed between the target nodes 100 based on the evaluation value (step S704).

For example, the control module 210 determines that a logical connection between the target nodes 100 is formed when the evaluation value or a rate of change of the evaluation value is greater than a threshold. Note that, the invention is not limited to contents of the criterion using the evaluation value.

The control module 210 moves to step S707 when it is determined that no logical connection is formed between the target nodes 100.

The control module 210 transmits a connection request to the target node 100 based on the address 902 of the target entry when it is determined that the logical connection is formed between the target nodes 100 (step S705). The connection request includes identification information and an address of the self-node 100.

At this time, the target node 100 adds an entry corresponding to a request source node 100 to the node connection information 220.

Next, the control module 210 updates the node connection information 220 when receiving a response to the connection request from the target node 100 (step S706), and then moves to step S707.

Specifically, the control module 210 adds an entry to the node connection information 220, and sets values of the node ID 901 and the address 902 of the target entry in the node ID 301 and the address 302 of the added entry.

In step S707, the control module 210 determines whether or not the processing for all entries in which the value of the hierarchy 903 matches the value of the hierarchical variable H is completed (step S707).

The control module 210 returns to step S702 and executes the same processing when it is determined that the processing for all entries in which the value of the hierarchy 903 matches the value of the hierarchical variable H is not completed.

The control module 210 determines whether or not the value of the hierarchical variable H is Hmax when it is determined that the processing for all entries in which the value of the hierarchy 903 matches the value of the hierarchical variable H is completed (step S708).

The control module 210 sets a value obtained by adding 1 to the value of the current hierarchical variable H to the hierarchical variable H when it is determined that the value of the hierarchical variable H is not Hmax (step S709). Thereafter, the control module 210 returns to step S702 and executes the same processing.

The control module 210 ends the processing when it is determined that the value of the hierarchical variable H is Hmax.

The control module 210 may determine whether or not an end condition is satisfied after the processing of step S707. For example, it is determined that the end condition is satisfied when the evaluation value is larger than a threshold. The control module 210 ends the processing when the end condition is satisfied. The control module 210 moves to step S708 when the end condition is not satisfied.

In FIG. 11, the control module 210 searches for the connection node 100 for each hierarchy, but the invention is not limited thereto. For example, the control module 210 may randomly select a target entry from the candidate node list 900.

Further, when the judgment result of step S708 is YES, the control module 210 may calculate an evaluation value when the connection node 100 forming the logical connection is deleted, and determine whether or not to delete the logical connection based on the evaluation value. The control module 210 transmits a deletion request to the target node 100, and deletes the entry corresponding to the target node 100 from the node connection information 220 when it is determined that the logical connection is to be deleted. At this time, the target node 100 deletes the entry corresponding to the request source node 100 from the node connection information 220 based on the connection request.

The control module 210 executes a neural network construction processing based on the history data after the configuration of the node network is changed. As a result, a neural network corresponding to the updated node network is constructed. That is, the objective function $f_i(x_i)$ corresponding to the node network is automatically set.

As described above, in the fourth embodiment, it is possible to dynamically optimize the configuration of the node network and the control of the node 100.

Note that, the invention is not limited to the embodiments described above, and includes various modifications. In addition, for example, the embodiments described above have been described in detail for easy understanding of the invention, and the invention is not necessarily limited to those including all configurations described above. In addition, a part of the configuration of each embodiment can be added, deleted, or replaced with another configuration.

Further, a part or all of the above-described configurations, functions, processing units, processing sections, and the like may be realized by hardware, for example, by designing an integrated circuit. Further, the invention can also be realized by program code of software that realizes the functions of the embodiments. In this case, a storage medium storing the program code is provided to a computer, and a processor included in the computer reads out the program code stored in the storage medium. In this case, the program code itself read out from the storage medium realizes the functions of the embodiments described above, and the program code itself and the storage medium storing the program code constitute the invention. Examples of a storage medium for supplying such program code include, for example, a flexible disk, a CD-ROM, a DVD-ROM, a hard disk, a Solid State Drive (SSD), an optical disk, a magneto-optical disk, a CD-R, a magnetic tape, a nonvolatile memory card, and a ROM.

Further, the program code for realizing the functions described in the present embodiment can be implemented in a wide range of programs or script languages such as assembler, C/C++, perl, Shell, PHP, Python, and Java (registered trademark).

Further, the program code of the software that realizes the functions of the embodiments may be stored in a storage section such as a hard disk or a memory of a computer or a storage medium such as a CD-RW or a CD-R by delivering via a network, and a processor included in the computer may read out and execute the program code stored in the storage section or the storage medium.

In the embodiments described above, control lines and information lines are considered to be necessary for description, and all control lines and information lines are not necessarily shown in the product. All configurations may be connected to each other.

What is claimed is:

1. An optimization system, comprising:
a plurality of nodes each including a processor, a memory connected to the processor, and a network interface connected to the processor, the plurality of nodes connected via a network and configure a target system to be optimized,
wherein the processor of each of the plurality of nodes is configured to:
calculate an optimum value of a determination variable as a solution of a first optimization problem by using an alternating direction method of multipliers, the first optimization problem being given by an objective function and a constraint function in which the determination variable, which represents a parameter that controls each of the plurality of nodes, serves as a variable,
receive an input of a value of the determination variable and calculate the value of the objective function based on a neural network constructed by a learning processing using learning data configured by the value of the determination variable and the value of the objective function,
control the nodes based on the optimum value of the calculated determination variable,
input an arbitrary value of the determination variable, and substitute the value of the calculated objective function and the arbitrary value of the determination variable into a second optimization problem given by the objective function and a function in which a dual variable serves as a variable by dual transformation of the first optimization problem, thereby repeatedly executing a processing of calculating a value of the dual variable until the value of the dual variable satisfies a predetermined condition,
acquire the value of the dual variable calculated by another node via the network interface and store the value in the memory,
calculate the optimum value of the determination variable of a self-node based on the value of the dual variable calculated by the self-node and the other node and stores the optimum value in the memory,
manage node connection information that stores information for access to a node that interacts with the self-node,
wherein the processor of a new node newly added to the target system is configured to:
determine the node that interacts with the self-node,
transmit a connection request to the determined node,
generate the node connection information by acquiring information for access to the determined node, and
acquire the history data from the determined node,
construct the neural network by executing the learning processing using the history data acquired from the determined node, and
wherein the processor of the node that receives the connection request is configured to add information for access to the new node to the node connection information.

2. The optimization system according to claim 1,
wherein the processor of each node is configured to accumulate history data configured by the calculated value of the objective function and the optimum value of the determination variable, and
construct the neural network by executing a learning processing using the history data as the learning data.

3. The optimization system according to claim 1,
wherein the processor the new node is configured to:
calculate a data amount of the history data acquired from the determined node based on strength of the interaction with the determined node, and
transmit an acquisition request including the data amount of the calculated history data to the determined node.

4. An optimization method of an optimization system, the method comprising:
providing a plurality of nodes, each of the nodes including a processor, a memory connected to the processor, and a network interface connected to the processor, the plurality of nodes connected via a network and configure a target system to be optimized;
each node executes steps comprising:
calculating an optimum value of a determination variable as a solution of a first optimization problem by using an alternating direction method of multipliers, the first optimization problem being given by an objective function and a constraint function in which the determination variable, which represents a parameter that controls each of the plurality of nodes, serves as a variable;
receiving an input of a value of the determination variable and calculating the value of the objective function based on a neural network constructed by a learning processing using learning data configured by the value of the determination variable and the value of the objective function;
controlling the nodes based on the optimum value of the calculated determination variable;
repeatedly execute a processing of calculating a value of a dual variable by inputting an arbitrary value of the determination variable, and substituting the value of the calculated objective function and the arbitrary value of the determination variable into a second optimization problem given by the objective function and a function in which the dual variable serves as a variable by dual transformation of the first optimization problem until the value of the dual variable satisfies a predetermined condition;
acquiring the value of the dual variable calculated by another node via the network interface and store the value in the memory;
calculating the optimum value of the determination variable of a self-node based on the value of the dual variable calculated by the self-node and the other node and stores the optimum value in the memory; and
managing node connection information that stores information for access to a node that interacts with the self-node,
wherein the processor of a new node newly added to the target system is configured to execute steps including:
determining the node that interacts with the self-node,
transmitting a connection request to the determined node,
generating the node connection information by acquiring information for access to the determined node, and
acquiring the history data from the determined node,
constructing the neural network by executing the learning processing using the history data acquired from the determined node, and
wherein the processor of the node that receives the connection request is configured to execute a step of adding information for access to the new node to the node connection information.

5. The optimization method according to claim 4, further comprising,
accumulating, by each of the nodes, history data configured by the value of the calculated objective function and the optimum value of the determination variable; and
constructing the neural network by executing a learning processing using the history data as the learning data.

6. The optimization method according to claim 4, wherein the step of acquiring the history data from the determined node includes the steps of:
causing the control unit of the new node to calculate a data amount of the history data acquired from the determined node based on strength of the interaction with the determined node; and
causing the control unit of the new node to transmit an acquisition request including the data amount of the calculated history data to the determined node.

* * * * *